United States Patent [19]
Seymour et al.

[11] Patent Number: 6,047,908
[45] Date of Patent: Apr. 11, 2000

[54] MANURE SPREADING APPARATUS

[75] Inventors: Shaun A. Seymour; Jack W. Crane, both of New Holland, Pa.

[73] Assignee: New Holland North America, Inc., New Holland, Pa.

[21] Appl. No.: 09/267,026

[22] Filed: Mar. 12, 1999

Related U.S. Application Data

[62] Division of application No. 08/927,146, Sep. 3, 1997, Pat. No. 5,941,464
[60] Provisional application No. 60/027,255, Sep. 30, 1996.
[51] Int. Cl.⁷ .................................................. A01C 19/00
[52] U.S. Cl. .......................... 239/675; 239/682; 222/272
[58] Field of Search .................................. 239/670, 672, 239/662, 675, 682, 687; 414/526; 222/272, 413, 627

[56] References Cited

U.S. PATENT DOCUMENTS

| | | | |
|---|---|---|---|
| 2,296,909 | 9/1942 | Dake | 239/665 |
| 5,435,494 | 7/1995 | Knight et al. | 239/675 |
| 5,941,464 | 8/1999 | Seymour | 239/675 |

*Primary Examiner*—Kevin Weldon
*Assistant Examiner*—Sean P. O'Hanlon
*Attorney, Agent, or Firm*—Frank A. Seemar; Larry W. Miller; J. William Stader

[57] ABSTRACT

A material spreader comprising a mobile tank for receiving and discharging waste material, such as manure. The spreader includes a conveying assembly comprising one or more augers rotatably mounted in the tank for conveying material received in the tank to a discharge area. An opening in the vicinity of the discharge area permits material to be dispensed to a slinger assembly mounted outside the tank adjacent the opening. Material is distributed by the slinger in a controlled pattern as the tank is transported over a field.

5 Claims, 6 Drawing Sheets

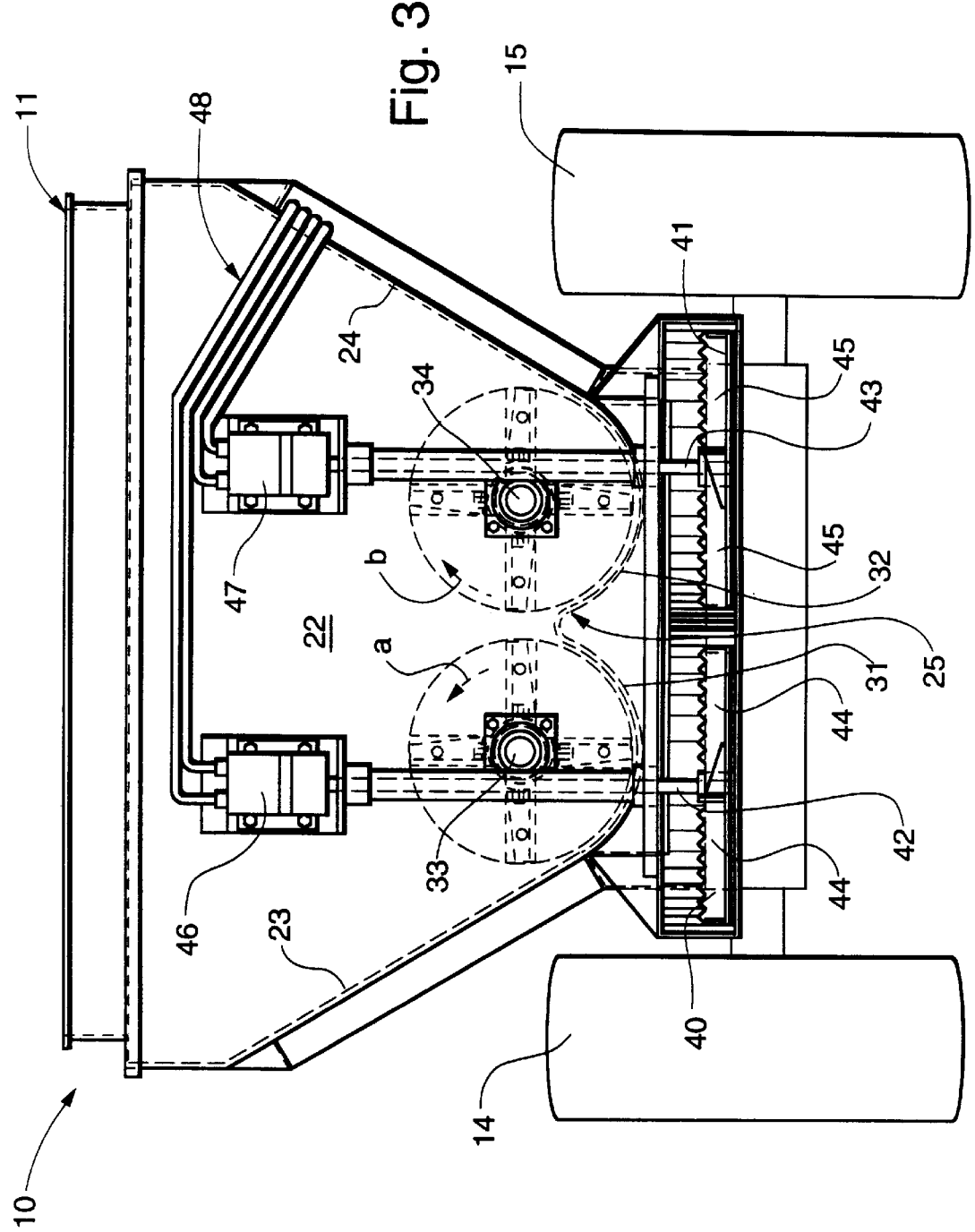

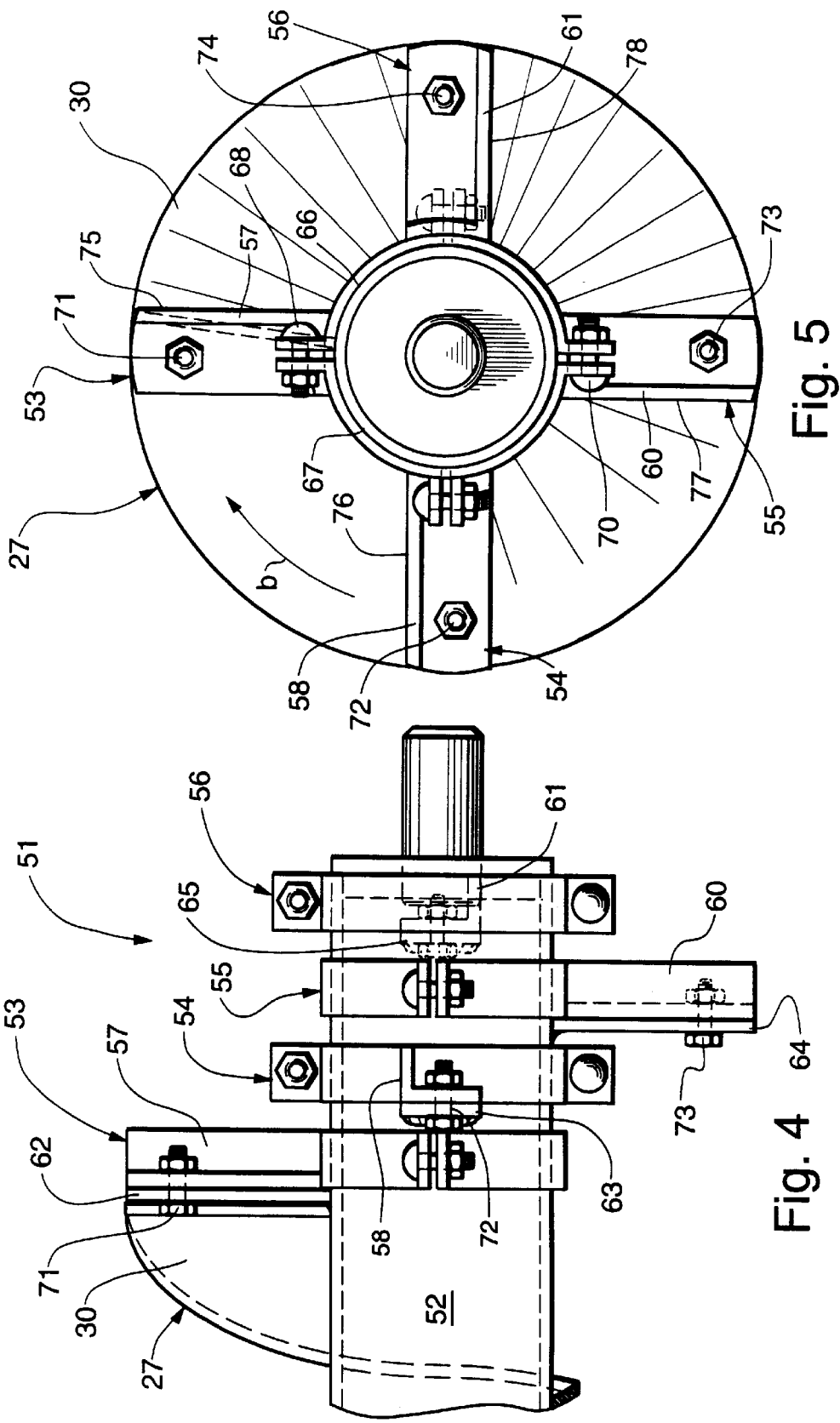

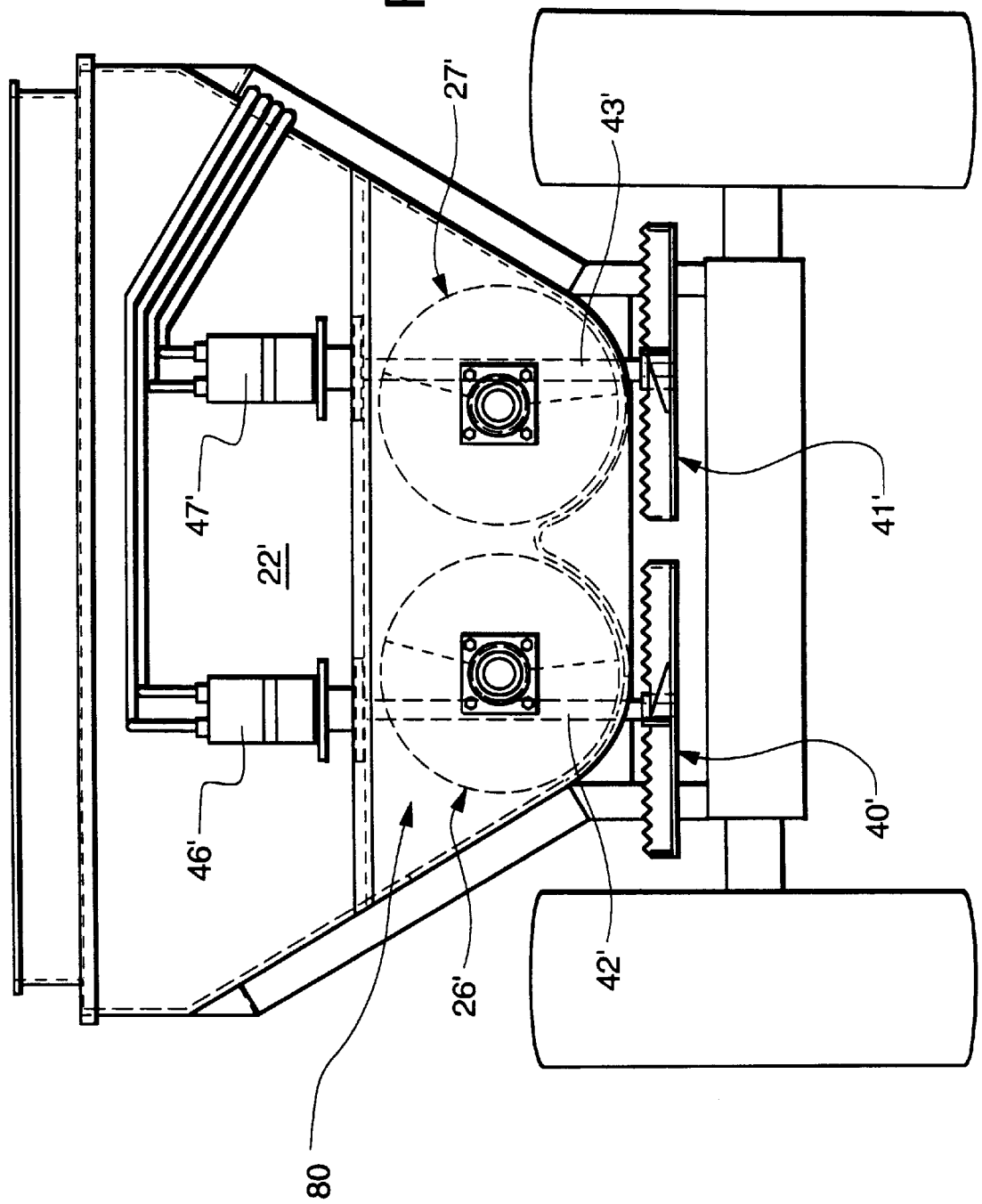

MANURE SPREADING APPARATUS

CROSS REFERENCE TO RELATED APPLLICATION

This application claims the benefit of U.S. Provisional Application Ser. No. 60/027,255, filed Sep. 30, 1996, and is a divisional of U.S. patent application Ser. No. 08/927,146, filed Sep. 3, 1997, now U.S. Pat. No. 5,941,464, entitled "Manure Spreader Apparatus".

FIELD OF THE INVENTION

The present invention relates generally to a tank type manure spreader and more particularly to apparatus for containing manure, transporting the contained manure to a discharge area, such as a field, and dispensing the manure onto the field.

BACKGROUND OF THE INVENTION

Various mobile equipment exists for dispensing a wide range of fertilizers onto lawns, gardens and fields. Of particular interest with respect to the present application is fertilizer spreading apparatus of the type commonly referred to as a manure spreader, which as its name implies is typically used to spread animal wastes, such as barnyard manure. In a typical farm operation, manure is hauled from a confined holding area and dispensed as fertilizer onto fields where crops are to be grown. To this end, a variety of manure spreaders have been developed over the years to haul and distribute different types of manure. For instance, conventional box spreaders are preferred for handling dry, clumpy types of manure.

Box spreaders, well known in the agricultural implement art, include a box-like container having a conveyor moveable along the floor for transferring the material to the rear of the box. Rotating beaters, typically paddle shaped, are mounted in a transverse fashion at the rear of the box to engage and break up the material that has been conveyed rearwardly. The paddles also serve to distribute the broken up material in a swath as the spreader is transported across the field.

Even though box spreaders have proven to be effective for dry, clumpy manure, they have not been as effective for transporting and distributing manure having a significant liquid content. One problem is that box spreaders are not sealed, resulting in leakage when liquid or semi-liquid is being transported to the field, which in many instances is over publicly traveled roadways. To overcome this and other problems encountered with respect to the handling of liquid types of manure, spreaders have been developed in which the material is held in a leak resistant container.

In one common design the container is a tank having a cross section that is generally V-shaped with inwardly angled sides for guiding the material to an auger assembly mounted in the bottom thereof, which in turn conveys the material to a distribution assembly for discharge from the tank. This type of spreader, as opposed to a box spreader, is commonly referred to as a tank spreader and is well adapted for handling cattle manure in liquid or slurry form as well as other types of manure such as swine and poultry manure.

In tank type spreaders, there are various arrangements employing either one or two augers for moving the material to the discharge area. A typical example of a single auger machine is shown in U.S. Pat. No. 5,221,049, issued Jun. 22, 1993 in the name of Gilbert W. Linde, et al. In this spreader a single auger in the bottom of the tank conveys material to a distribution assembly that expels material out the side of the tank. The spreaders described in the following paragraphs all relate to double auger machines.

In U.S. Pat. No. 5,386,943, issued Feb. 7, 1995 in the name of Kenneth J. Peters, a dual auger arrangement is depicted in which a transverse beater type expeller is mounted above the augers to engage material as it is urged rearwardly by the augers. In U.S. Pat. No. 5,199,638, issued Apr. 6, 1993 in the name of Thomas R. Fischer, and U.S. Pat. No. 5,275,335, issued Jan. 4, 1994 in the name of Stanley W. Knight, et al, dual augers, rotating in the same direction, are utilized in a cooperative manner to convey material to a side discharge assembly. In the '335 patent one auger is mounted above the other, while in the '638 patent the augers are mounted in a side-by-side fashion at the same elevation. In still another representative prior art machine, dual augers are shown in U.S. Pat. No. 5,435,494, issued Jul. 25, 1995 also in the name of Stanley W. Knight, et al. In one embodiment of the '494 machine the augers are counter rotating and have different diameters, one of which is used as a feed auger and the other of which is used as a discharge auger.

In another type of prior art tank spreaders, dual augers urge material to expellers that are mounted for rotation about rearwardly located horizontal shafts. Exemplary of this combination are U.S. Pat. No. 3,871,588, issued Mar. 18, 1975 in the name of John B. Long, et al, U.S. Pat. No. 4,124,166, issued Nov. 7, 1978 in the name of Gustave Lucas, and U.S. Pat. No. 4,801,085, issued Jan. 31, 1989 in the name of Thomas R. Fischer.

In yet another arrangement wherein dual augers urge material rearwardly for discharge, expellers are mounted to rotate about vertical axes. Typical of this latter arrangement, is U.S. Pat. No. 5,501,404, issued Mar. 26, 1996 in the name of Donald A. Meyer, et al, which in the principal embodiment shows rotary expeller means with blades extending from a vertical shaft mounted rearwardly and external of the tank.

Another example of the latter arrangement is an early U.S. Pat. No. 2,296,909, issued Sep. 29, 1942 in the name of Merrills L. Dake, showing a truck mounted spreader used for spreading granulated material, such as salt, sand, or the like. In this spreader the augers, mounted within a flat bottomed tank, are counter rotating to discharge the material through an opening in the back wall of the tank onto distribution discs rotating about vertical shafts.

Notwithstanding the numerous kinds of spreaders available for transporting and discharging slurry type manures that are somewhat liquid in consistency, applicants have embraced additional needs for a reliable spreader that effectively spreads manure in a desired pattern on the field. More particularly, applicants have determined that the general need exists for spreading material, having a range of liquification from a sticky type pen manure to a wetter type, such as municipal sludge, without disruption of operation regardless of weather conditions. The below described apparatus is a new and useful solution, not heretofore devised, to these problems that addresses these needs.

SUMMARY OF THE INVENTION

An important object of the present invention is to overcome the problems mentioned above by providing improved mobile apparatus for transporting and distributing material such as manure.

In pursuance of this and other important objects the present invention contemplates a new and improved material spreader having a mobile tank for receiving and discharging material to be distributed, a pair of augers rotatably mounted in the tank for conveying material received in the tank to a discharge area, an opening in the tank in the vicinity of the discharge area, and distribution means mounted outside the tank for receiving material discharged through the opening and distributing it as the tank is transported over a field. The distribution means comprise a pair of slingers each associated with a corresponding auger and comprising a flat material receiving spinner member having material engaging means extending upwardly therefrom. The distribution means further comprising a pair of rotatably mounted vertical shafts on which the material receiving spinner members are mounted, and means for rotating the shafts in opposite directions, whereby material received in the tank is urged toward the discharge area by the augers and dropped on the spinner members via the opening whereupon it is engaged by the material engaging means and propelled away from the tank.

The invention more particularly contemplates a material spreader of the general type described above wherein the augers have an end portion with interrupted flighting extending outwardly from the rear wall of the tank. The augers are operatively disposed above the spinner members mounted on vertical driven shafts extending through the interruptions in the flighting.

The foregoing and other objects, features and advantages of the invention will appear more fully hereinafter from a consideration of the detailed description which follows, in conjunction with the accompanying sheets of drawings wherein both the principal embodiment and a second embodiment of the present invention are illustrated by way of example. It is to be expressly understood, however, that the drawings are for illustrative purposes and are not to be construed as defining the limits of the invention.

DESCRIPTION OF THE DRAWINGS

FIG. 3 is a view, taken from the right end of the manure spreader shown in FIGS. 1 and 2.

FIG. 4 is an enlarged fragmentary top view of the rear portion of the auger on the right side of the manure spreader shown in FIGS. 1–3.

FIG. 5 is an end view of the auger shown in FIG. 4.

FIG. 8 is a view, taken from the right end of the manure spreader shown in FIGS. 6 and 7.

DESCRIPTION OF THE INVENTION

Figure 1:
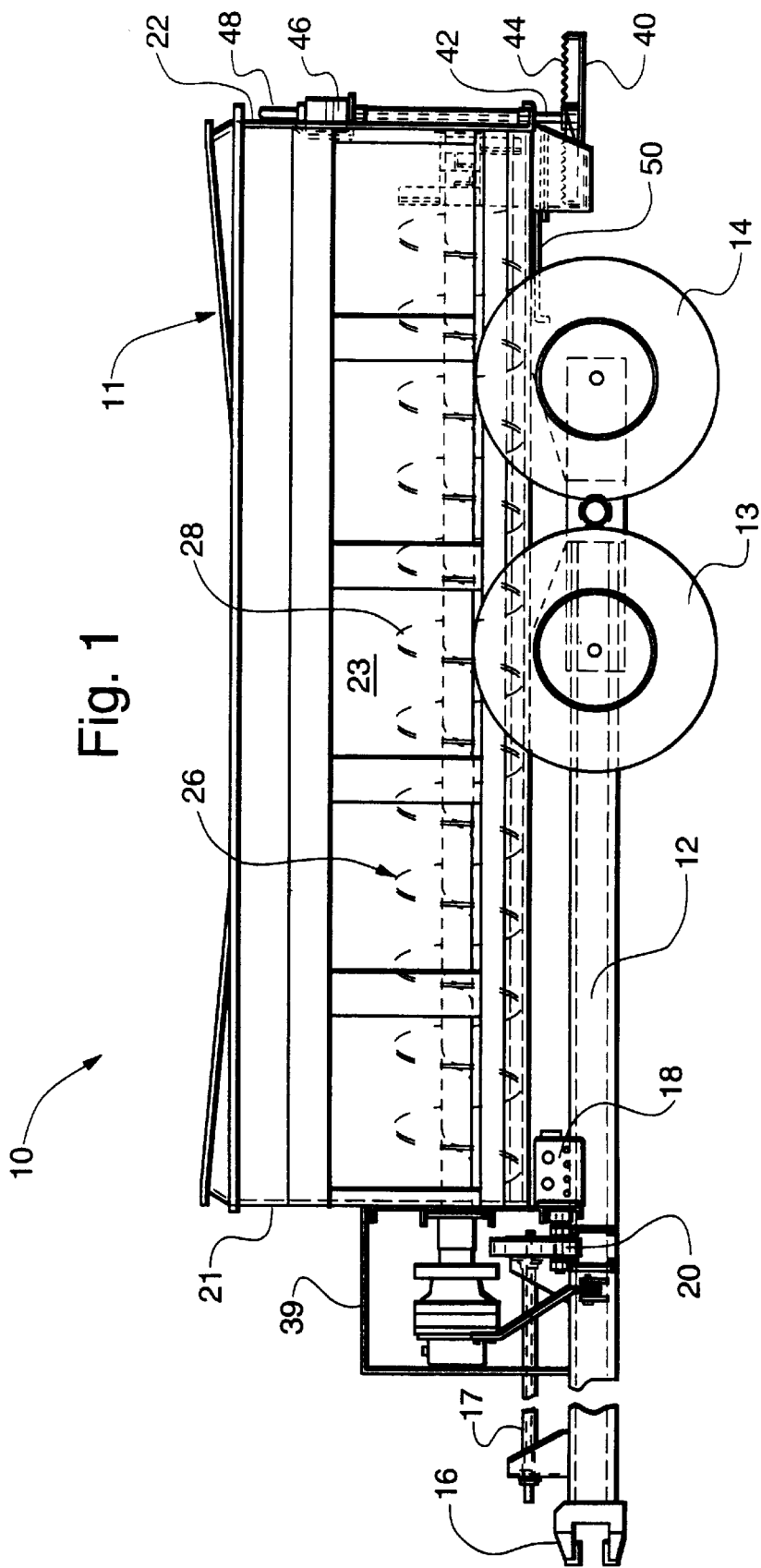
FIG. 1 is a side elevational view of a manure spreader.
Figure 2:
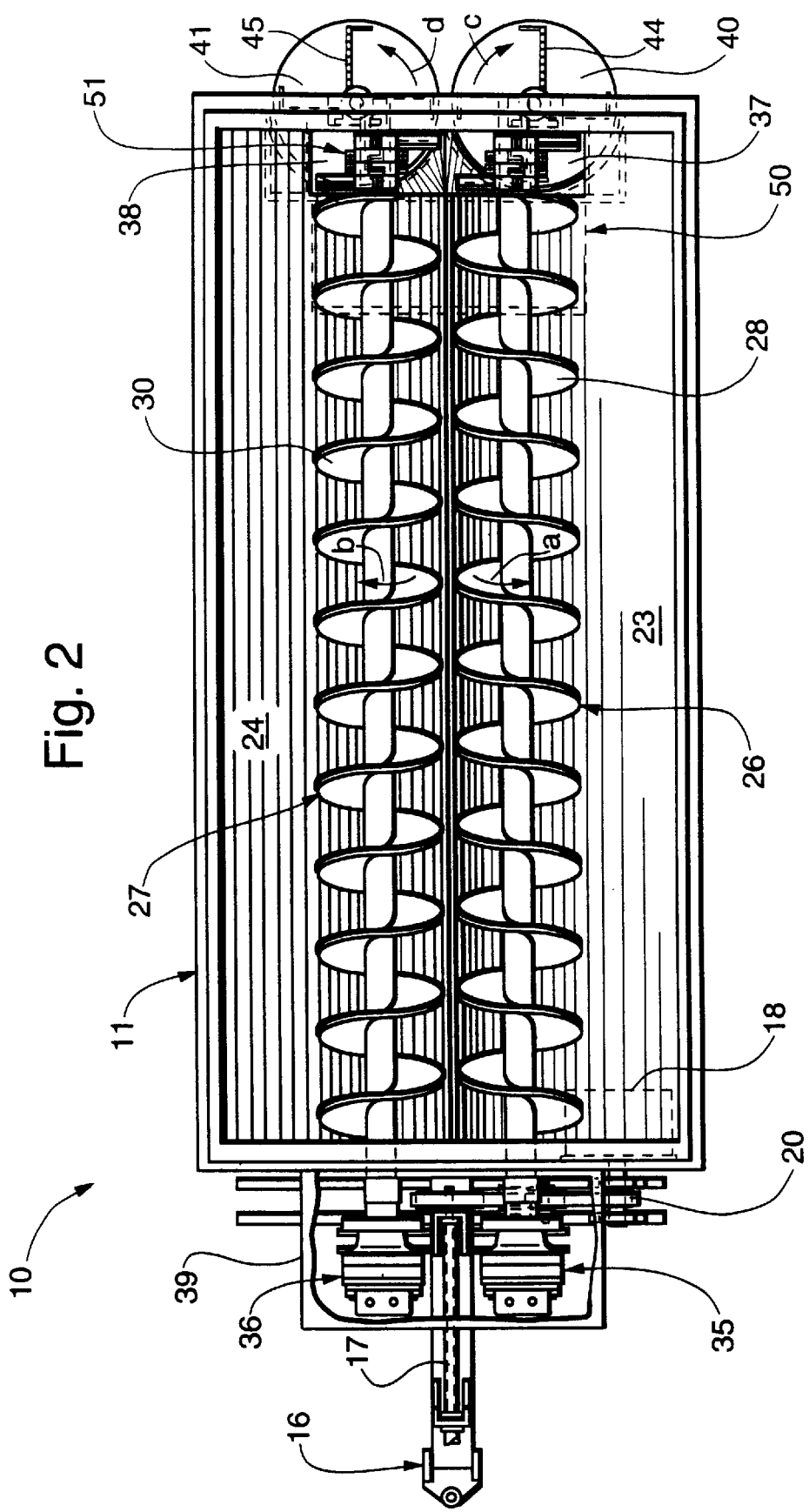
FIG. 2 is a top view of the manure spreader shown in FIG. 1.

Referring now to the drawings for a more detailed description of the present invention, FIGS. 1, 2 and 3 show the side, top and end views of a manure spreader, generally designated by reference numeral 10, in which the elements of the present invention are incorporated. More specifically, spreader 10 includes a tank 11, with a capacity of 3000 gallons, mounted on a frame 12 supported by a pair of tandem ground engaging wheels 13, 14 on the left side, shown in FIG. 1, and a like pair of tandemly mounted ground engaging wheels 15 (only one shown) on the right side. A towing vehicle, such as a tractor, is hitched in towing and driving engagement with the spreader via a tongue 16 and a drive shaft 17. Rotative force from shaft 17 (attached to tractor power take-off ("PTO") shaft in conventional manner) is coupled to hydraulic pump 18 via drive belt 20.

Tank 11 comprises front wall 21, rear wall 22, a pair of inclined side walls 23, 24, and bottom 25 comprising a pair of side-by-side, adjacent, arcuate troughs separated by an intermediate interconnecting area. Mounted within the trough are a pair of augers 26, 27 having flighting 28, 30 with a circular projection of approximately 24 inches that is accommodated by the radius of the arcuate troughs 31, 32, respectively. The augers, mounted in bearing assemblies 33, 34 affixed to the rear wall 22, are driven by a pair of hydraulic motors 35, 36 to rotate flighting 28, 30 in opposite directions (arrows a and b) that urge material in the bottom of tank 11 in a rearward direction. Motors 35, 36 operatively coupled to pump 18 in a conventional manner, are mounted on frame 12 within enclosure 39 extending forwardly from front wall 21.

A discharge area in the rear bottom vicinity of tank 11 includes arcuate openings 37, 38 in the bottom of the rear most part of the troughs. Directly below the opening are a pair of slinger assemblies comprising 30 inch circular spinner elements 40, 41, mounted for rotation in directions c, d, respectively, via driven shafts 42, 43 extending downwardly from hydraulic motors 46, 47 secured to back wall 22 of tank 11. Motors 46, 47 are coupled to pump 18 via appropriate hydraulic lines 48 in a conventional manner for providing rotative force to the slinger assemblies. Extending upwardly from spinners 40, 41 are a plurality of material engaging fins 44, 45, respectively, for engaging material discharged from the tank through openings 37, 38. The number and shape of the fins on the spinners is varied to accommodate the material and desired spread pattern of the material being distributed rearwardly from the spreader as it traverses the field. The spread pattern can also be changed by varying the volume of material delivered to the slingers. To this end, gate 50 (FIGS. 1 and 2) can be slideably adjusted to block or completely close openings 37, 38. Gate 50 is shown in the full open position.

Now turning to FIGS. 4 and 5 for a detailed description of a feed assist assembly, generally designated by reference numeral 51. Also see FIG. 2, where the feed assist assembly is shown in the vicinity of opening 38. Only one feed assist assembly will be described hereinafter; however, it should be understood that identical assemblies are used, one being associated with each of the augers. Rearwardly of where flighting 30 of auger 27 terminates along core 52, adjacent opening 38 (see FIG. 2), are four paddle assemblies 53, 54, 55, 56, secured axially along core 52. Four paddles 57, 58, 60, 61, extending at 90 degree increments, are secured to rigid elements 62, 63, 64, 65, welded to core 52, by shear bolts 71, 72, 73, 74. Completing each paddle assembly, using assembly 56 as an example, are semi-circular clamping elements 66, 67 that conform to the outer surface of core 52, and are held snugly in place by bolts 68, 70 for conjoint rotation of the paddles with auger 27.

Thus, under conditions where feed assist assembly 51 is rotated in direction b, the forwardly facing surfaces 75, 76, 77, 78 of paddles 57, 58, 60, 61, respectively, engage manure in the discharge area for delivery to the slingers via the openings in the bottom of tank 11. In the event the material is frozen to a degree that it is not being properly fed through the opening the shear bolts will shear at a predetermined level of force in a conventional manner. When this occurs rigid elements 62, 63, 64, 65 will break away from the paddles and continue to rotate with auger 27 and slice through the rigid material that is otherwise immovable via the paddles. The clamping force holding the paddles is set at a predetermined level sufficient to permit independent rotation of core 52 within the semi-circular clamping elements when the shearing force of the shear bolts is attained.

Figure 7:
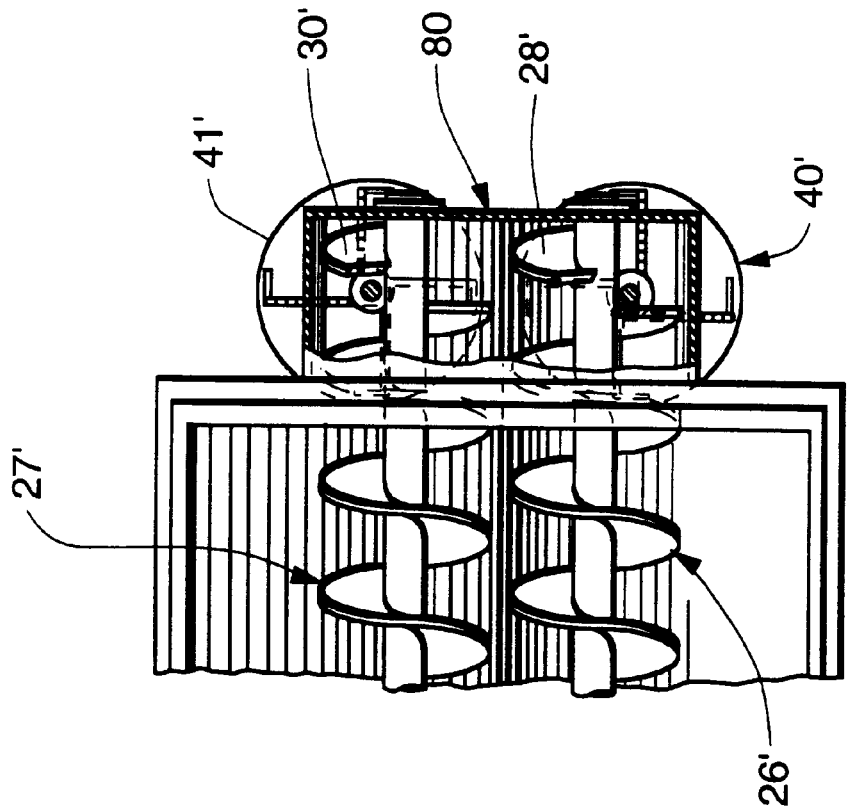
FIG. 7 is a fragmentary top view of the manure spreader shown in FIG. 6.
Figure 6:
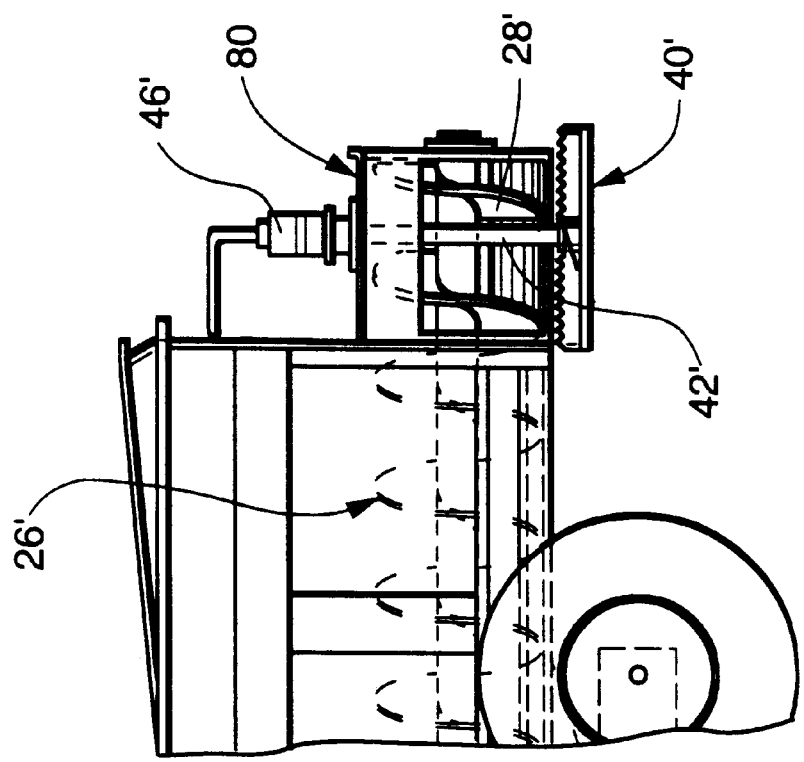
FIG. 6 is a fragmentary side elevational view of a manure spreader in which the elements of the claimed invention are incorporated.

A spreader is shown in FIGS. 6, 7 and 8 of the drawings in which the elements of the claimed invention are incorporated. In this apparatus the rearmost portions of the augers 26', 27' comprise interrupted flighting 28', 30', that extends beyond the rear wall 22' to discharge material rearwardly from the tank to compartment 80 and then downwardly to spinners 40', 41', which are disposed on shafts 42', 43' extending below compartment 80'. Hydraulic motors 46', 47' rotate shafts 42', 43' which extend through the interruptions in flighting 28', 30. The forward components of the spreader (not shown) are identical to those shown in FIGS. 1, 2 and 3.

Of the many implicit and explicit advantages of the present invention one of the most important is the provision of a spreader that accommodates and distributes efficiently and effectively large amounts of material, especially slurry type manure of varying consistencies, regardless of weather conditions.

While preferred structure in which the principles of the present invention are shown and described above, it is to be understood that the invention is not limited to such preferred structure, but that, in fact, widely different means of varying scope and configuration may be employed in the practice of the invention.

Having thus described the invention, what is claimed is:

1. A material spreader comprising
    a mobile tank for receiving, transporting and discharging material to be distributed,
    a pair of augers rotatable mounted in said tank for conveying material received in said tank to a discharge area, each of said augers comprise a cylindrical core and flighting extending outwardly therefrom,
    an opening in the bottom of said tank in the vicinity of said discharge area,
    distribution means mounted outside said tank for receiving material discharged through said opening and distributing it as the tank is transported over a field,
    said distribution means comprising a pair of slingers each associated with a corresponding auger and comprising a flat material receiving spinner member located below said opening,
    said material receiving spinner having material engaging means extending upwardly therefrom,
    said distribution means further comprising a pair of rotatable mounted vertical shafts on which said material receiving spinner members are mounted, and means for rotating said shafts in opposite directions, whereby material received in said tank is urged toward said discharge area by said augers and delivered to said spinner members via said opening whereupon it is engaged by said material engaging means and propelled outwardly from said tank,
    said tank including a rear compartment,
    said augers each having a rearward end section extending into said rear compartment,
    said opening disposed in the bottom of said rear compartment,
    said flighting interrupted at said rearward end section, and
    said vertical shafts extending through said interruptions in said flighting.

2. A material spreader as set forth in claim 1 wherein said opening is directly below said rearward end sections of said augers.

3. A material spreader as set forth in claim 2 wherein said spinners members are directly below said rearward end section of said augers.

4. A material spreader as set forth in claim 3 wherein said vertical shafts extend in close proximity to the rear sections of said cylindrical cores of said augers.

5. A material spreader as set forth in claim 1 wherein said vertical shafts extend in close proximity to the rear sections of said cylindrical cores of said augers.

* * * * *